United States Patent
Hashim

[11] 3,864,481
[45] Feb. 4, 1975

[54] ANTI DISEASE PRODUCING SYNTHETIC MATERIAL FOR THE PREVENTION SUPPRESSION AND DIAGNOSIS OF MULTIPLE SCLEROSIS AND METHOD OF TREATMENT THEREFOR

[75] Inventor: George A. Hashim, Barney Park, N.Y.

[73] Assignee: St. Luke's Hospital, New York, N.Y.

[22] Filed: Dec. 14, 1972

[21] Appl. No.: 315,140

[52] U.S. Cl................ 424/177, 260/121, 260/112, 260/112.5
[51] Int. Cl............................................ A61k 27/00
[58] Field of Search................ 260/112.5, 112, 121; 424/177

[56] References Cited
UNITED STATES PATENTS
3,274,060  9/1966  Bossinger................. 424/177

Primary Examiner—Elbert L. Roberts

[57] ABSTRACT

Anti disease producing synthetic material for the prevention, suppression or diagnosis of multiple sclerosis in mammals and method of treatment therefor is disclosed. A therapeutic preparation of the synthetic material is adapted to be administered in therapeutic dosage units to mammals and is selected from formulae:

(X)

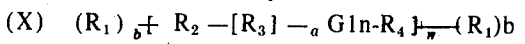

where;
Each $R_1$ is individually selected from the class consisting of an amino acid residue, albumin, Gamma Globulin or synthetic peptide containing at least a single amino acid residue;
$R_2$ is selected from the class consisting of Trp or Tyr;
$R_3$ is an amino acid residue;
$R_4$ is selected from the class consisting of Lys, Arg or His;
$a$ is 0–4; $b$ is 0 or at least 1; and $n$ is at least 1 or (Y) 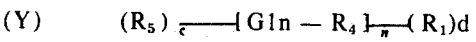
$R_5$ is $R_1$ or $R_2$;
$c$ and $d$ are 0 or at least 1
$n$ is at least 1

9 Claims, No Drawings

ANTI DISEASE PRODUCING SYNTHETIC MATERIAL FOR THE PREVENTION SUPPRESSION AND DIAGNOSIS OF MULTIPLE SCLEROSIS AND METHOD OF TREATMENT THEREFOR

BACKGROUND OF THE INVENTION

It has been reported that the basic protein isolated from myelin of the central nervous system of man and animals induces experimental allergic encephalomyelitis (EAE), an autoimmune disease of the central nervous system. Also, it has been shown that the disease inducing basic protein is readily hydrolyzed by proteolytic enzymes. It is also known that there is more than one disease inducing region found on the native basic protein molecule. These regions have been isolated in the form of peptides following hydrolysis of the basic protein. The essential requirement for disease induction is the linear sequence of at least nine amino acid residues having the formula H-Phe-Ser-Trp-Gly-Ala-Glu-Gly-Gln-Lys-OH (Formula A).

For disease induction of guinea pigs the linear sequence of amino acid residues required is the formula H-Phe-Ser-Trp-Gly-Ala-Glu-Gly-Gln-Arg-OH (Formula B) and for the disease induction in monkeys and rabbits the linear sequence of amino acid residues required is the formula H-Thr-Thr-His-Tyr-Gly-Ser-Leu-Pro-Gln-Lys-OH (Formula C). Investigators have shown that EAE can be induced in animals by administering one of the disease inducing regions of the basic proteins. Other disease inducing peptides produced from the native basic protein by hydrolysis have been isolated. The disease induced by the active regions has the same clinical and pathological manifestations as that produced when the whole protein is administered.

SUMMARY OF THE INVENTION

My invention generally contemplates providing a synthetic peptide material which is capable of inhibiting the induction of experimental allergic encephalomyelitis (EAE). EAE is the experimental model disease for multiple sclerosis in man. The synthetic peptide can be used for the prevention, suppression or diagnosis of multiple sclerosis in mammals and for the method of treatment therefor. The synthetic peptide is administered in a therapeutic preparation and is selected from the formulae:

(X) $(R_1)_b[R_2-[R_3]_a-Gln-R_4]_n-(R_1)_b$ where;
Each $R_1$ is individually selected from the class consisting of an amino acid residue, Albumin, Gamma Globulin or synthetic peptide containing at least a single amino acid residue;
$R_2$ is selected from the class consisting of Trp or Tyr;
$R_3$ is an amino acid residue;
$R_4$ is selected from the class consisting of Lys, Arg or His;
a is 0–4; b is 0 or at least 1; and n is at least 1
or (Y) $(R_5)_c-[Gln - R_4]_n-(R_1)_d$ $R_5$ is $R_1$ or $R_2$;
c and d are 0 or at least 1
n is at least 1

It is an object of the invention to provide a synthetic material which is non-encephalitogenic when administered in therapeutic dosage to mammals. It is another object of the invention to provide a synthetic material adapted for administration in humans for the prevention, suppression and diagnosis of multiple sclerosis. It is also an object of the invention to provide a method of treatment for mammals whereby EAE is either prevented and/or suppressed. Still another object of the invention is to provide a material adapted to be administered in therapeutic dosage units which will prevent the re-occurrence of encephalomyelitis and suppress in the active stage further deterioration of nervous tissue in mammals including human beings. A further object of the invention is to provide a synthetic material which will prevent the formation of newly sensitized cells and block active sensitized cells from doing further damage to nervous tissue.

DESCRIPTION OF THE INVENTION

For a better understanding of the invention the following are the definitions of the symbols used to identify certain amino acids (unless otherwise specified are Levo form) employed in the formulae:

| | | | |
|---|---|---|---|
| Lys | — Lysine | Gly | — Glycine |
| His | — Histidine | Ala | — Alanine |
| Arg | — Arginine | Leu | — Leucine |
| Thr | — Threonine | Ileu | — Isoleucine |
| Ser | — Serine | Tyr | — Tyrosine |
| Glu | — Glutamic Acid | Trp | — Tryptophan |
| Pro | — Proline | Phe | — Phenylalanine |
| Gln | — Glutamine | | |

The term "residue" implies any amino acid of the Levo form found in mammals unless otherwise specified.

The method employed to form the synthetic linear peptides defined in Formula (X) and Formula (Y) above follows the solid phase peptide synthesis procedure described by R. B. Merrifield in the Journal of the American Chemical Society, Vol. 85, p. 2149, (1963); G. R. Marshall and R. B. Merrifield, Biochemistry, Vol. 4, p. 2394, (1965); and A. Marglin and R. B. Merrifield, Journal of the American Chemical Society, Vol. 88, p. 5051 (1966).

The foregoing procedure was followed to obtain the following synthetic peptides under Formula (X).

| Formula No. | |
|---|---|
| 1. | H-(Gly)$_2$-Trp-(Gly)$_4$-Gln-Lys-OH |
| 2. | H-(Gly)$_2$-Trp-(Gly)$_4$-Gln-Arg-OH |
| 3. | H-(Gly)$_2$-Tyr-(Gly)$_4$-Gln-Lys-OH |
| 4. | H-(Gly)$_2$-Tyr-(Gly)$_4$-Gln-Arg-OH |
| 5. | H-(gly)$_2$-Trp-(Gly)$_4$-Gln-His-OH |
| 6. | H-(gly)$_2$-Tyr-(Gly)$_4$-Gln-His-OH | and the following under Formula (Y)

| Formula No. | |
|---|---|
| 7. | Gly-Gly-Trp-Gln-Lys-Synthetic peptide |

| Formula No. | |
|---|---|
| 8. | Phe-Ser-Trp-Gln-Arg-Synthetic peptide |
| 9. | Phe-Ser-Trp-Gln-His-Synthetic peptide |

Albumin, gamma globulin and synthetic peptides may be reacted with the -OH group at the C-terminal position of the above formulae to obtain a greater molecular weight, act as a carrier to prevent accelerated decay and enhance the immune response to the synthetic peptide after it has been administered, and allow the peptide to attach to and block sensitized cells from doing further damage.

When the synthetic material of Formula (X) is in the form of a tripeptide $R_2$-Gln-$R_4$ that is where $R_1$ and $R_3$ are missing the tripeptide is made following the procedure of Merrifield identified above. When more than one of the tripeptides are linked together, that is, when n of Formula (X) is greater than 1 the resulting polypeptide is made following the procedure of Messrs. Hirshmann R., et al, Journal of the American Chemical Society, Vol. 91, p. 507, (1969). Such peptides following this procedure may be represented as $(Trp-Gln-Lys)_n$; $(Trp-Gln-Arg)_n$; $(Trp-Gln-His)_n$; $(Tyr-Gln-Lys)_n$; $(Tyr-Gln-Arg)_n$; and $(Tyr-Gln-His)$. When administered, these peptides prevent cells destined to produce disease from producing pathologic damage to the nervous tissues in mammals.

Use For Diagnosis

Any of the synthetic peptides of the invention herein described may be used to elicit a delayed type skin hypersensitivity in mammals. For diagnosis of multiple sclerosis in mammals the synthetic peptides of the invention herein are administered subcutaneously. It has been determined that the synthetic peptide following the general Formulae (X) and (Y) are essential to produce a delayed type skin hypersensitivity reaction in mammals. For example, any of the synthetic peptides following Formulae 1 through 9 may be used for diagnosis. However, it is preferred to use the dipeptide of Formula (Y) for diagnosis to produce the delayed type skin hypersensitivity in mammals. Any enlargement of the molecular weight of the dipeptide of Formula (Y) at the C-terminal amino acid residue or the N-terminal glutamine will enhance the delayed type skin response and reduce the effective dosage required for diagnosis. When the -(-Gln-$R_4$-)- dipeptide is attached to a macromolecule such as albumin, gamma globulin or synthetic peptide as little as one microgram of the dipeptide is required per skin test.

Therapeutic Use

The synthetic peptides of the invention herein have been administered to mammals in varying therapeutic dosage. As much as 1,000 micrograms per kilogram of body weight have been administered with no apparent clinical or histological signs of disease. A therapeutic dose for treatment of mammals may be at least one microgram (0.001 mg) per kilogram body weight. Generally, the amount administered per kilogram of body weight may be reduced as a function of molecular weight. The preferred therapeutic dose generally varies from 0.5 mg to 5.0 mg per kilogram of body weight.

As indicated above the synthetic material of the invention herein may be administered to mammals in a form in which the OH group at the C-terminal position is reacted with a macromolecule. The following synthetic peptides were obtained by reacting albumin, gamma globulin and synthetic peptide and are useful as therapeutic material to be administered to mammals for the prevention, suppression or diagnosis of multiple sclerosis.

Gly-Gly-Trp-(Gly)$_4$-Gln-Lys-albumin
Gly-Gly-Trp-(Gly)$_4$-Gln-His-albumin
Gly-Gly-Trp-(Gly)$_4$-Gln-Arg-albumin
(Gly)$_4$-Tyr-(Gly)$_4$-Gln-Lys-albumin
(Gly)$_4$-Tyr-(Gly)$_4$-Gln-His-albumin
(Gly)$_4$-Tyr-(Gly)$_4$-Gln-Arg-albumin
Gly-Gly-Trp-(Gly)$_4$-Gln-Lys-gamma globulin
Gly-Gly-Trp-(Gly)$_4$-Gln-His-gamma globulin
Gly-Gly-Trp-(Gly)$_4$-Gln-Arg-gamma globulin
(Gly)$_4$-Tyr-(Gly)$_4$-Gln-Lys-gamma globulin
(Gly)$_4$-Tyr-(Gly)$_4$-Gln-His-gamma globulin
(Gly)$_4$-Tyr-(Gly)$_4$-Gln-Arg-gamma globulin
Gly-Gly-Trp-(Gly)$_4$-Gln-Lys-synthetic peptide
Gly-Gly-Trp-(Gly)$_4$-Gln-His-synthetic peptide
Gly-Gly-Trp-(Gly)$_4$-Gln-Arg-synthetic peptide
(Gly)$_4$-Tyr-(Gly)$_4$-Gln-Lys-synthetic peptide
(Gly)$_4$-Tyr-(Gly)$_4$-Gln-His-synthetic peptide
(Gly)$_4$-Tyr-(Gly)$_4$-Gln-Arg-synthetic peptide Experiments Relative to Non-Disease Inducing Characteristics In the following tables experiments were conducted on test animals using the synthetic material of the invention herein in varying dosage units. The synthetic material administered to all the test animals, guinea pigs (Table 1), rabbits (Table 1A) and rats (Table 1B) was (Formula 1) H—(Gly)$_2$—Trp—(Gly)$_4$—Gln-Lys—OH.

The synthetic peptide of this invention (Formula I) was administered subcutaneously to guinea pigs, rabbits and rats at concentrations of 10, 100, 250, 500 and 1500 micrograms as a single dose in complete Freund's adjuvant as the carrier for the purpose of determining whether or not the synthetic peptide material is non-encephalitogenic. None of the animals showed any clinical signs of disease within the expected time, i.e. less than 20 days. These signs include loss of weight, tremors and incontinence (see Tables 1, 1A and 1B). In Tables 1, 1A and 1B the Group III animals represents the control groups in which the animals were injected with only the complete Freund's adjuvant. Complete Freund's adjuvant is sold by the Difco Company under catalogue number 0638-60-7 Bacto Adjuvant Complete Freunds. None of the animals exhibited any signs of disease. The Group IV animals of tests 1 and 1A were administered the native peptide Formula (A) and were not administered any of the synthetic peptide material. In Table 1B the Group IV animals were administered basic protein, a polypeptide isolated from bovine myelin protein and were not administered any of the synthetic peptide material. The disease was induced in all of the Group IV test animals.

Generally 10–15 microgram doses of the native peptide, i.e. Formula A induces the disease in less than 20 days and death results 2-3 days post onset of signs. The animals were observed for more than 90 days. At this time the animals remained healthy and their growth rate did not differ from the normal. As noted above, the control animals were given only the carrier adjuvant. Histological examination of brain and spinal cord sections from each animal including the control animals showed the absence of lesions characteristic of the disease but lesions characteristic of the disease were evident from similar sections taken from Group IV animals.

TABLE 1

Guinea Pigs

| Group No. | I | II | III | IV |
|---|---|---|---|---|
| No. of Animals | 15 | 15 | 15 | 15 |
| Dose Formula (1) | 10 μg | 500 μg | 0 | 0 |
| Formula (A) | | | | 20 μg |
| Clinical Disease Score: | | | | |
| 30 days | 0/15 | 0/15 | 0/15 | 14/15 |
| 90 days | 0/15 | 0/15 | 0/15 | 15/15 |

Formula (1) H-Gly$_2$-Trp-(Gly)$_1$-Gln-Lys-OH

Formula (A) H-Phe-Ser-Trp-Gly-Ala-Glu-Gly-Gln-Lys-OH

TABLE 1A

Rabbits

| Group No. | I | II | III | IV |
|---|---|---|---|---|
| No. of Animals | 10 | 10 | 10 | 15 |
| Dose Formula (1) | 500 μg | 1500 μg | 0 | 0 |
| Formula (A) | | | | 50 μg |
| Clinical Disease Score: | | | | |
| 30 days | 0/10 | 0/10 | 0/10 | 12/15 |
| 90 days | 0/10 | 0/10 | 0/10 | 13/15 |

TABLE 1B

LEWIS RATS

| Group No. | I | II | III | IV |
|---|---|---|---|---|
| No. of Animals | 10 | 10 | 10 | 10 |
| Dose Formula (1) | 100 μg | 250 μg | 0 | 0 |
| Basic Protein* | | | | 50 μg |
| Clinical Disease Score: | | | | |
| 30 days | 0/10 | 0/10 | 0/10 | 8/10 |
| 90 days | 0/10 | 0/10 | 0/10 | 10/10 |

* Basic protein is the native protein isolated from bovine myelin known to induce disease (EAE) in at least 50% in mammals such as guinea pigs, rats and rabbits when administered sub-cutaneously, intramuscularly, intravenously or in any combination thereof at dosage levels of 10 μg or more.

It can be seen from the results given in Tables 1, 1A and 1B, that the synthetic peptide material (Formula 1) was inactive and did not induce disease when administered to the test animals of Groups I and II when compared to the control group of test animals Group III. However, it can be seen from Tables 1, 1A and 1B that the disease was induced in Group IV animals when administered the native peptide of Formula (A) or the native peptide found in basic protein. It can be concluded that the synthetic material of the invention herein does not induce disease and is non-EAE producing.

The above experiment was repeated using similar experimental settings and test animals, i.e. guinea pigs, rabbits and rats in which the conditions were maintained to that of the foregoing experiment. The only change in each test was the substitution of a different synthetic peptide material of the invention herein, i.e. Formulae 2–6 supra for the Formula 1. The results obtained using Formulae 2 through 6 were identical to the results obtained using Formula 1. None of the animals exhibited any clinical signs of disease within the expected time period, i.e. less than 20 days. None of the animals lost weight or showed signs of tremors or incontinence. However, those animals of Group IV administered the native material specified, i.e., the encephalitogenic disease inducing material came down with the disease.

Prevention Type Experiments

In Table II, prevention type experiments were conducted on guinea pigs, rats and rabbits using the synthetic material of the invention herein and using varying dosages of Formula 1.

Three groups of test animals were set up, each group included two control groups with an identical number of animals. In each case the animals of control groups B were administered only the carrier and were not immunized with Formula 1.

At day zero Group I animals except Group IB guinea pigs were injected subcutaneously with 250 micrograms of Formula 1 emulsified in incomplete Freund's adjuvant as carrier. Incomplete Freund's adjuvant is sold by the Difco Company under catalogue number 0639-60-6 Bacto Adjuvant.

Group II animals except Group IIB rats were injected subcutaneously with 150 micrograms of Formula 1 dissolved in saline.

Group III animals except Group IIIB rabbits were injected intraveneously with 1500 micrograms of Formula 1.

The above procedure was followed daily for 14 consecutive days. Each animal in Group I except Group IB received 14 injections of 250 micrograms for a total of 3,500 micrograms. Each animal in Group II except Group IIB received 14 injections of 150 micrograms for a total of 2,100. Each animal in Group III except Group IIIB received 14 injections of 1500 micrograms for a total of 21,000 micrograms. At day 7 all of the Group I animals except Group IB were challenged with 25 micrograms of the disease inducing peptide (Formula A); Group II animals, except Group IIA, were challenged with 150 μg of bovine basic protein isolated from myelin protein and Group III animals, except Group IIIA, were challenged with 50 μg of Formula (C).

All animals of control Group B which were injected with the disease inducing peptide began to show clinical evidence of disease in 12 to 14 days. Eighty to ninety percent of these animals died by day 20. In all cases the untreated control groups A showed no evidence of disease. The animals of Groups I, II and III which were treated with Formula 1 prior to being challenged with the disease inducing peptide as indicated in Table II showed no clinical evidence of the disease and remained healthy for 90 days when they were sacrificed.

Pretreatment of the animals with Formula (1) induced the sensitization of cells with the synthetic disease non-inducing peptide which allowed the sensitized cells to recognize any agent with the same structural characteristics. Thus, when the disease inducing peptide or the native basic protein was administered at day 7 it was recognized by the synthetic peptide sensitized cells and prevented the native materials from inducing the disease as it did in the Group B test animals.

clinical symptoms of the disease were apparent in experimental Groups I and II for a period of three months when they were sacrificed — see Table III as follows:

TABLE II

Prevention of Disease in Mammals

| | Guinea Pigs | | | Rats | | | Rabbits | | |
|---|---|---|---|---|---|---|---|---|---|
| Group | I | IA | IB | II | IIA | IIB | III | IIIA | IIIB |
| No. of Animals | 15 | 15 | 15 | 15 | 15 | 15 | 15 | 15 | 15 |
| Day 0–14 | 250 μg Formula (1) | 250 μg Formula (1) | 0 | 150 μg Formula (1) | 150 μg Formula (1) | 0 | 1500 μg Formula (1) | 1500 Formula (1) | 0 |
| Day 7 | 25 μg Formula (A) | 0 | 25 μg Formula (A) | 50 μg B.P. * | 0 | 50 μg B.P. * | 50 μg Formula (C) | 0 | 50 μg Formula (C) |
| Clinical Disease Score: | | | | | | | | | |
| Day 37 | 0/10 | 0/15 | 13/15 | 0/15 | 0/15 | 13/15 | 0/15 | 0/15 | 12/15 |
| Day 97 | 0/15 | 0/15 | 13/15 | 0/15 | 0/15 | 13/15 | 0/15 | 0/15 | 13/15 |

Formula 1 : H-Gly-Gly-Trp-Gly-Gly-Gly-Gly-Gly-Lys-OH
Formula A : H-Phe-Ser-Trp-Gly-Ala-Glu-Gly-Gln-Lys-OH
Formula C : H-Thr-Thr-His-Tyr-Gly-Ser-Leu-Pro-Gln-Lys-OH
NOTE: All animals in Groups IA and IB were administered 250 μg of incomplete Freund's adjuvant (IFA) daily for 14 days. All animals in Groups IIA and IIB were administered 150 μg of isotonic saline daily for 14 days. Group III animals were not injected with any carrier.
* Basic Protein identified above.

Also, the structure for the basic protein was published by E. H. Eylar, Steven Brostoff, George Hashim, Juanita Caccam, and Paul Burnett entitled "Basic A1 Protein of the Myelin Membrane", The Journal of Biological Chemistry, Vol. 246, No. 18, Issue of September 25, 1971, pp. 5770–5784.

Suppression Type Experiments

In Table III below suppression type experiments were conducted on guinea pigs to show the effect of administering the disease producing native peptide (formula A). The animals were injected with the synthetic material of the invention herein (formula 1) at varying periods after the initial injection of the native peptide and using varying dosages.

Four groups of guinea pigs were employed. Group IV animals received neither the disease inducing native peptide (formula A) nor the synthetic material of the invention herein (formula 1) and served as a second control group. Group III animals were treated with the native peptide (formula A) only at day zero by the injection of 25 micrograms emulsified in complete Freund's adjuvant and served as a first control group. Group I animals were injected with 25 micrograms of the disease inducing native peptide (formula A) emulsified in complete Freund's adjuvant at day zero. Also, Group I animals received daily injections for 14 consecutive days of 250 micrograms each of formula 1 dissolved in saline administered intraveneously, the first injection being administered starting day zero. Group II animals received the identical treatment of Group I animals except Group II animals received the initial injection of formula 1 at day 7 and continued daily for 14 consecutive days, each injection containing 250 micrograms of formula 1 in saline for a total of 3,500 micrograms.

Eighty percent of the first control group showed evidence of disease within 16 days post sensitization and died by day 20. The second control group remained healthy throughout the experiment. Experiment Groups I and II lost about 10% of body weight at day 14–16 and began to gain weight thereafter. No other

TABLE III

Suppression of Disease in Guinea Pigs

| Group No. | I | II | III | IV |
|---|---|---|---|---|
| No. of Animals | 15 | 15 | 15 | 15 |
| Day 0 (formula A) | 25 μg | 25 μg | 25 μg | 0 |
| Day 0–14 (formula 1) | 250 μg | 0 | 0 | 0 |
| Day 7–21 (formula 1) | 0 | 250 μg | 0 | 0 |
| Clinical Disease Score: | | | | |
| 16 Days | 0/15 | 0/15 | 12/15 | 0/15 |
| 30 Days | 0/15 | 0/15 | 12/15 | 0/15 |
| 90 Days | 0/15 | 0/15 | 12/15 | 0/15 |

In this type experiment the disease inducing peptide Formula administered at day 0 results in the formation of sensitized cells which in turn give rise to clinical symptoms of the disease. However, when Formula I is administered as the synthetic peptide analogue to the disease inducing native peptide (Formula A), the sensitized cells recognize the synthetic peptide and suppress further or continued induction of the disease of the invention herein. The continued treatment is effective in neutralizing or immunizing the disease inducing cells as they become sensitized. This approach is the reverse of that shown for prevention type experiment in which the treatment prevents cells from becoming disease inducing.

Procedure For Administration to Mammals

A. For prevention of multiple sclerosis in mammals the synthetic peptide material or its derivatives of the invention herein is administered subcutaneously or intramuscularly;

B. For the treatment of multiple sclerosis in mammals the synthetic material or its derivatives of the invention herein is administered intramuscularly, subcutaneously or intravenously or in any combination thereof.

Procedure For Diagnosis of Multiple Sclerosis in Mammals

For diagnosis of multiple sclerosis in mammals at least one microgram of the synthetic peptides or their derivatives of the invention herein are administered subcutaneously. The extent of the positive reaction is measured and reported in mm diameter of the erythema formed. A reaction is considered positive when the erythema is visible after 3–6 hours and reaches maximum size at 24 hours.

I claim:

1. The method of treating a mammal which is useful for the prevention, suppression and diagnosis of multiple sclerosis which comprises:

administering to said mammal from about 0.001 mg to about 1,000 micrograms per kilogram of body weight of a synthetic material having the general formula selected from the class consisting of compounds of the formula:

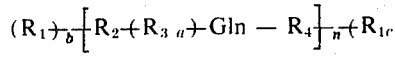

where;
each $R_1$ is an animo acid residue;
$R_2$ is selected from the class consisting of Trp and Tyr;
$R_3$ is an amino acid residue;
$R_4$ is selected from the class consisting of Lys, Arg and His;
$a$ is 0–4; $b$ and $c$ are each 0 or at least 1 and $n$ is at least 1;

and compounds of the formula:

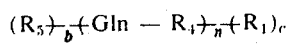

where;
$R_5$ is selected from the class consisting of $R_1$ and $R_2$ as defined above; and $R_4$, b, c and n are as defined above.

2. The method of claim 1 wherein said mammal is a human.

3. The method of claim 1 wherein the amount of synthetic material administered is from about 0.5 mg to 5.0 mg per kilogram of body weight per unit dosage.

4. The method of treating a mammal which is useful for the prevention, suppression and diagnosis of multiple sclerosis which comprises:

administering to said mammal from about 0.001 mg. to about 1,000 micrograms per kilogram of body weight of a synthetic material having the general formula:

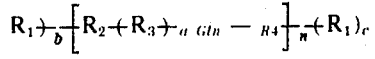

where;
each $R_1$ is an amino acid residue;
$R_2$ is selected from the class consisting of Trp and Tyr;
$R_3$ is an amino acid residue;
$R_4$ is selected from the class consisting of Lys, Arg and His;
$a$ is 0–4; $b$ and $c$ are each 0 or at least 1 and $n$ is at least 1.

5. A method of treating a mammal which is useful for the prevention, suppression and diagnosis of multiple sclerosis which comprises:

administering to said mammal from about 0.001 mg. to about 1000 micrograms per kilogram of body weight:

where;
$R_1$ is an amino acid residue
$R_5$ is an amino acid residue;
$R_4$ is selected from the class consisting of Lys, Arg and his;
c and d are 0 or at least 1; and n is at least 1.

6. A method according to claim 1 wherein said administering is by sub-cutaneous injection, whereby a diagnosis of multiple sclerosis is indicated by a delayed type skin hypersensitivity.

7. A method according to claim 1 wherein said administering is by sub-cutaneous, intramuscular or intravenous injection.

8. A method according to claim 4 wherein said synthetic material is of the formula: H - Gly - Gly - Trp - Gly - Gly - Gly - Gly - Gln - Lys - OH.

9. A method according to claim 4 wherein said administering is by sub-cutaneous, intra-muscular or intravenous injection.

* * * * *

UNITED STATES PATENT OFFICE
CERTIFICATE OF CORRECTION

PATENT NO. : 3,864,481
DATED : February 4, 1975
INVENTOR(S) : George A. Hashim

It is certified that error appears in the above-identified patent and that said Letters Patent are hereby corrected as shown below:

At Column 5, line 16, - "Formula (1) H-Gly)$_2$-Trp-(Gly)$_4$-Gln-Lys-OH" should read --- Formula (1) H-(Gly)$_2$-Trp-(Gly)$_4$-Gln-Lys-OH ---

At Column 7, Table II,- "Formula 1: H-Gly-Gly-Trp-Gly-Gly-Gly-Gly-Gly-Lys-OH" should read --- Formula 1: H-Gly-Gly-Trp-Gly-Gly-Gly-Gly-Gln-Lys-OH ---

At Column 9, Claim 1, line 9, "$(R_1)_b\text{---}(R_2)\text{---}(R_3)_a\text{---}Gln\text{---}(R_4)_n\text{---}(R_1)_c$" should read --- $(R_1)_b\text{---}(R_2)\text{---}(R_3)_a\text{---}Gln\text{---}(R_4)_n\text{---}(R_1))_c$ ---

At Column 10, Claim 5, line 6, after the word "weight" insert

--- of a synthetic material having the general formula ---

Signed and sealed this 27th day of May 1975.

(SEAL)
Attest:

RUTH C. MASON
Attesting Officer

C. MARSHALL DANN
Commissioner of Patents
and Trademarks